United States Patent
Kim et al.

(10) Patent No.: US 12,227,868 B2
(45) Date of Patent: Feb. 18, 2025

(54) ELECTROLYTIC COPPER FOIL CAPABLE OF PREVENTING TEARING OR WRINKLE DEFECTS, ELECTRODE CONTAINING SAME, SECONDARY BATTERY CONTAINING SAME, AND METHOD FOR MANUFACTURING SAME

(71) Applicant: SK NEXILIS CO., LTD., Jeongeup-si (KR)

(72) Inventors: Young Tae Kim, Jeongeup-si (KR); Sang Hyun Jun, Jeongeup-si (KR); Jeong Gil Lee, Jeongeup-si (KR); Seung Min Kim, Jeongeup-si (KR)

(73) Assignee: SK NEXILIS CO., LTD., Jeongeup-si (KR)

( * ) Notice: Subject to any disclaimer, the term of this patent is extended or adjusted under 35 U.S.C. 154(b) by 666 days.

(21) Appl. No.: 17/432,593

(22) PCT Filed: Nov. 5, 2020

(86) PCT No.: PCT/KR2020/015390
§ 371 (c)(1),
(2) Date: Aug. 20, 2021

(87) PCT Pub. No.: WO2021/091250
PCT Pub. Date: May 14, 2021

(65) Prior Publication Data
US 2022/0119973 A1    Apr. 21, 2022

(30) Foreign Application Priority Data
Nov. 8, 2019 (KR) .................. 10-2019-0142712

(51) Int. Cl.
| | | |
|---|---|---|
| H01M 4/66 | (2006.01) | |
| C25D 3/38 | (2006.01) | |
| C25D 5/48 | (2006.01) | |
| H01M 4/02 | (2006.01) | |

(52) U.S. Cl.
CPC .............. C25D 3/38 (2013.01); C25D 5/48 (2013.01); H01M 4/661 (2013.01); H01M 2004/027 (2013.01)

(58) Field of Classification Search
CPC .. C25D 3/38; C25D 5/48; C25D 1/04; H01M 4/661; H01M 2004/027; H01M 10/0525; H01M 4/667; H01M 10/052; H01M 4/13; C23C 2222/10; C23C 2222/20; Y02E 60/10
See application file for complete search history.

(56) References Cited

U.S. PATENT DOCUMENTS

| | | | |
|---|---|---|---|
| 2015/0340639 A1* | 11/2015 | Matsuura | H10K 30/81 205/50 |
| 2019/0003066 A1* | 1/2019 | Kim | H01M 4/667 |
| 2019/0006658 A1 | 1/2019 | Chae et al. | |

FOREIGN PATENT DOCUMENTS

| | | |
|---|---|---|
| CN | 108306022 A | 7/2018 |
| CN | 110396704 A | 11/2019 |
| CN | 110997983 A | 4/2020 |
| EP | 3608447 A1 | 2/2020 |
| JP | H09241882 A | 9/1997 |
| JP | 2001011685 A | 1/2001 |
| KR | 20190007705 A | 1/2019 |
| KR | 20190009048 A | 1/2019 |
| KR | 20190025273 A | 3/2019 |
| KR | 20190093448 A | 8/2019 |

OTHER PUBLICATIONS

International Search Report for related International Application No. PCT/KR2020/015390; action dated May 14, 2021; (7 pages).
Written Opinion for related International Application No. PCT/KR2020/015390; action dated May 14, 2021; (5 pages).
Supplementary Search Report for related European Application No. 20884440.7; action dated Sep. 12, 2022; (17 pages).
Extended European Search Report for related European Application No. 23188409.9; action dated Oct. 11, 2023; (21 pages).
Office Action for related Japanese Application No. 2021-548179; action dated Aug. 9, 2022; (4 pages).
Office Action for related Chinese Application No. 202080017027.5; action dated Jan. 5, 2024; (4 pages).
Search Report for related Chinese Application No. 202080017027.5; action dated Jan. 5, 2024; (2 pages).

* cited by examiner

Primary Examiner — Muhammad S Siddiquee
(74) Attorney, Agent, or Firm — K&L Gates LLP

(57) ABSTRACT

One embodiment of the present disclosure provides an electrolytic copper foil includes a copper layer and has a width direction weight deviation of 5% or less calculated according to Equation 1 below, a tensile strength of 25 kgf/mm$^2$ to 62 kgf/mm$^2$, and a valley depth-to-thickness (VDT) of 3.5 to 66.9 calculated according to Equation 2 below.

width direction weight deviation (%)=(standard deviation of weight/arithmetic mean of weight)×100, and    [Equation 1]

VDT=[thickness of electrolytic copper foil]/[maximum valley depth of roughness profile($Rv$)].    [Equation 2]

8 Claims, 5 Drawing Sheets

[FIG. 1]
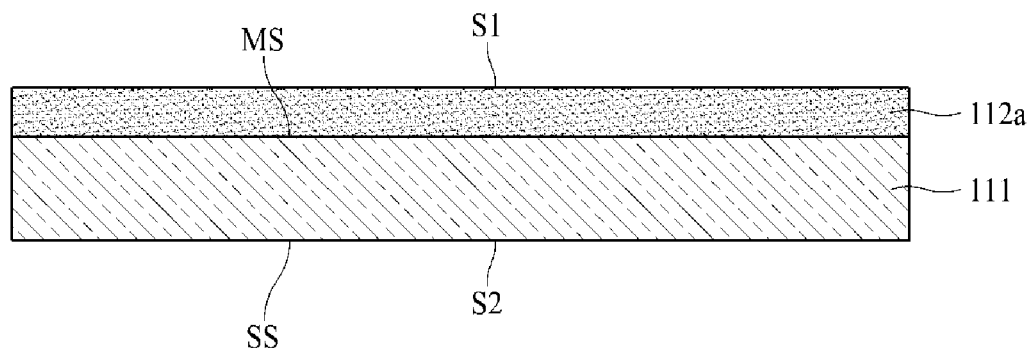
[FIG. 2]
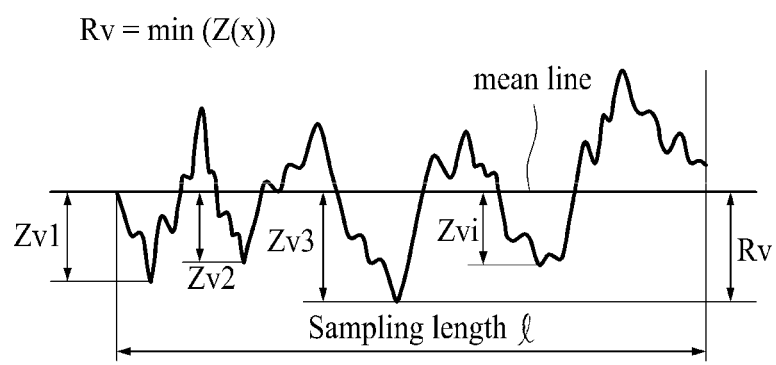

[FIG. 3]
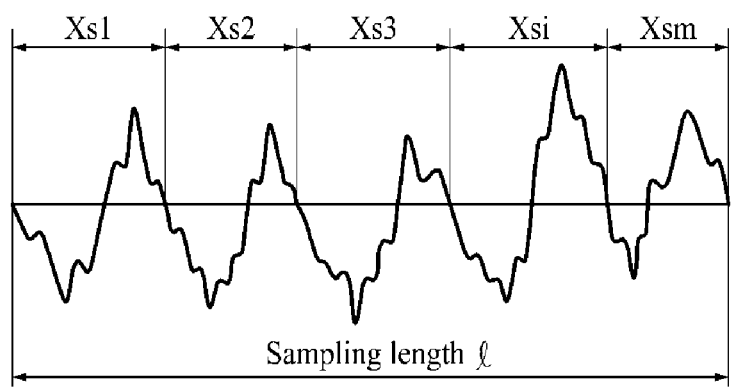
[FIG. 4]
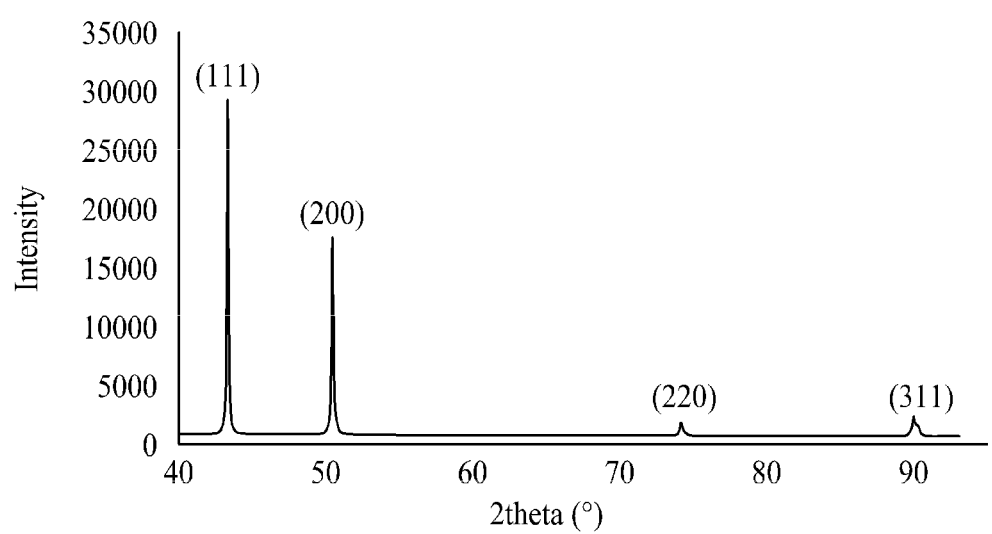

【FIG. 5】
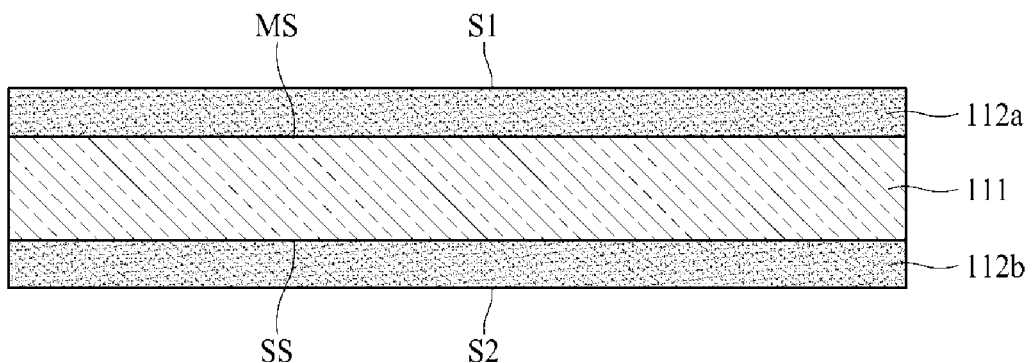
【FIG. 6】
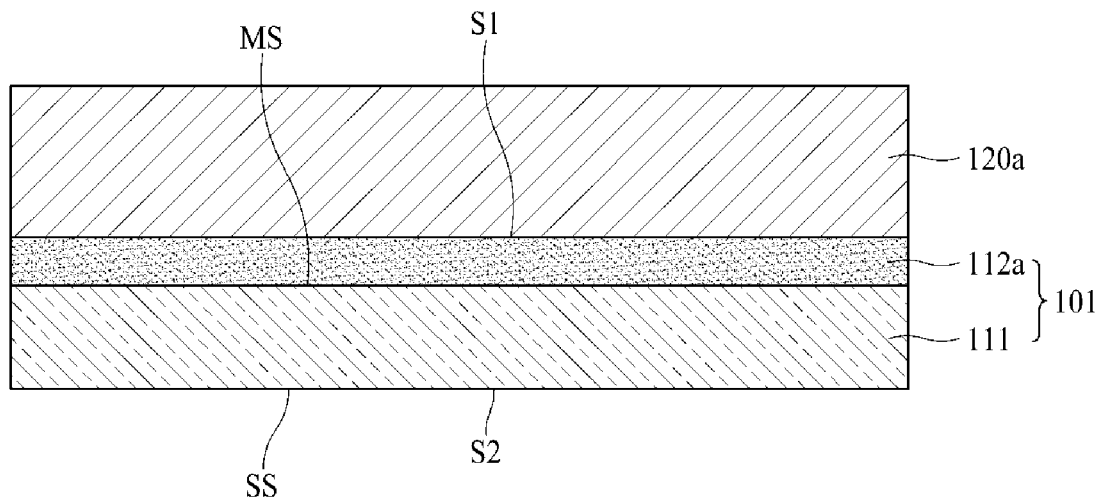

[FIG. 7]
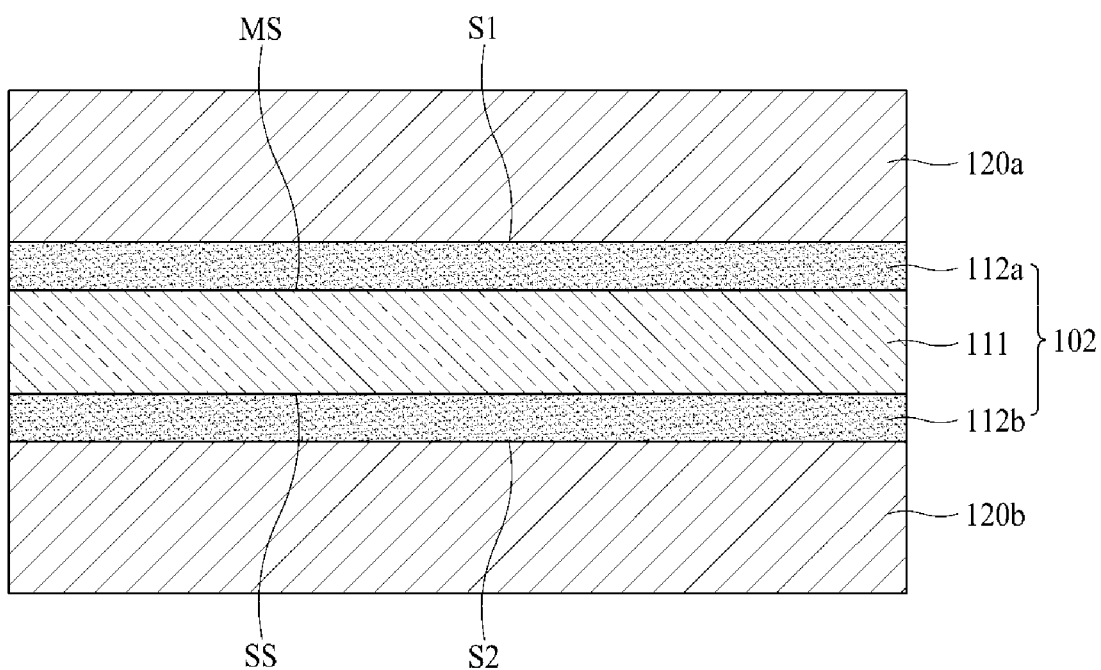

【FIG. 8】
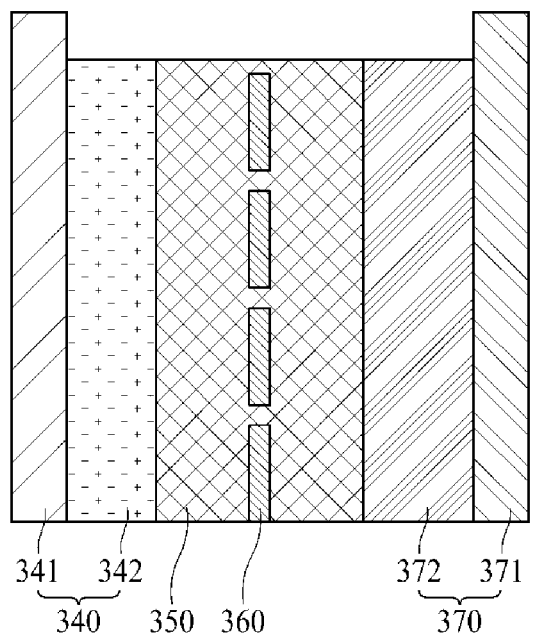
【FIG. 9】
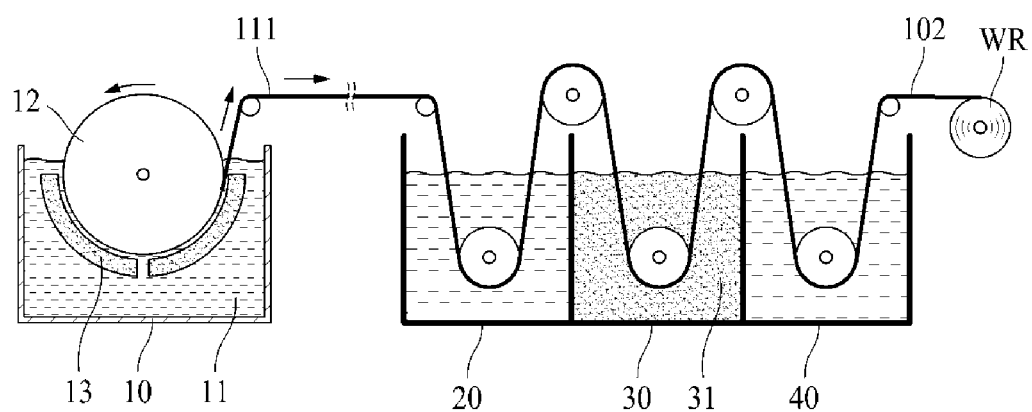

ELECTROLYTIC COPPER FOIL CAPABLE OF PREVENTING TEARING OR WRINKLE DEFECTS, ELECTRODE CONTAINING SAME, SECONDARY BATTERY CONTAINING SAME, AND METHOD FOR MANUFACTURING SAME

CROSS-REFERENCE TO RELATED APPLICATIONS

The present application is a National Stage of International Application No. PCT/KR2020/015390 filed on Nov. 5, 2020, which claims the benefit of Korean Patent Application No. 10-2019-0142712, filed on Nov. 8, 2019, with the Korean Intellectual Property Office, the entire contents of each hereby incorporated by reference.

FIELD

The present disclosure relates to an electrolytic copper foil in which a valley depth-to-thickness and a deviation of a valley depth-to-thickness are optimized to prevent tear or wrinkle defects, an electrode including the electrolytic copper foil, a secondary battery including the electrode, and a method of manufacturing the electrolytic copper foil.

BACKGROUND

A secondary battery is a type of energy converter that converts electrical energy into chemical energy, stores the chemical energy, and generates electricity by converting the chemical energy into electrical energy when the electricity is needed. The secondary battery is used as an energy source for electric vehicles as well as portable home appliances such as mobile phones and laptop computers. The secondary battery is rechargeable and thus is also referred to as a rechargeable battery.

As secondary batteries that have economic and environmental advantages over disposable primary batteries, there are lead storage batteries, nickel cadmium secondary batteries, nickel hydride secondary batteries, and lithium secondary batteries.

In particular, lithium secondary batteries may store a relatively large amount of energy relative to a size and weight thereof as compared with other secondary batteries. Therefore, in the field of information communication devices in which portability and mobility are important, the lithium secondary batteries are preferred, and an application range thereof is also expanding to energy storage devices for hybrid vehicles and electric vehicles.

Lithium secondary batteries are used by repeatedly performing a cycle including charging and discharging. When a certain device is operated with a fully charged lithium secondary battery, the lithium secondary battery should have a high charge/discharge capacity to increase an operating time of the device. Accordingly, there are continuous demands for research to satisfy users' increasing needs for a charge/discharge capacity of lithium secondary batteries.

Such a secondary battery includes an anode current collector made of a copper foil. Among copper foils, an electrolytic copper foil is widely used as an anode current collector of a secondary battery. Along with an increase in demand for secondary batteries, there is an increase in demand for secondary batteries with high capacity, high efficiency, and high quality, and thus, there is a need for copper foils capable of improving characteristics of secondary batteries. In particular, there is a need for copper foils that can impart high capacity to secondary batteries and enable secondary batteries to stably maintain capacity and performance.

As copper foils become thinner, an amount of active materials that may be included in the same space may be increased, and the number of current collectors may be increased. Thus, the capacity of secondary batteries may be increased.

However, as copper foils become thinner, a valley depth-to-thickness is decreased, and thus, defects such as tears of electrolytic copper foils occur in a manufacturing process of the electrolytic copper foils. For this reason, there is difficulty in manufacturing and using very thin film-type copper foils.

On the other hand, as electrolytic copper foils become thicker, the capacity and efficiency of secondary batteries are decreased, and a valley depth-to-thickness is increased too much so as to cause a slip in a manufacturing process of the electrolytic copper foils. For this reason, defects such as wrinkles of electrolytic copper foils occur.

In addition, not only in a manufacturing process of an electrolytic copper foil, but also in a manufacturing process of an electrodes for a secondary battery or a secondary battery using the electrolytic copper foil, tears or wrinkles should not occur in the electrolytic copper foil. In particular, in a rolling process or a coating process of active materials in a manufacturing process of a copper foil or a secondary battery using the copper foil through a roll-to-roll (RTR) process, defects, in which an edge of the copper foil is torn, should not occur.

Therefore, in order to manufacture a secondary battery with high capacity, high efficiency, and high quality and to increase the manufacturing yield of an electrolytic copper foil and a secondary battery using the same, there is a need to manufacture an electrolytic copper foil having an appropriate valley depth-to-thickness. To this end, a manufacturing process of the electrolytic copper foil should be precisely controlled.

SUMMARY

The present disclosure relates to an electrolytic copper foil capable of satisfying the limitations and requirements of the related technology, an electrode including the electrolytic copper foil, a secondary battery including the electrode, and a method of manufacturing the electrolytic copper foil.

The present disclosure is directed to providing an electrolytic copper foil which is not wrinkled or torn in a manufacturing process even while being thin. The present disclosure is also directed to providing an electrolytic copper foil which is not wrinkled or torn in a manufacturing process of an electrode for a secondary battery or a secondary battery using an electrolytic copper foil.

The present disclosure is also directed to providing an electrode for a secondary battery including such an electrolytic copper foil, and a secondary battery including the electrode for a secondary battery.

The present disclosure is also directed to providing a method of manufacturing an electrolytic copper foil in which wrinkles or tears are prevented.

Apart from the aspects of the present disclosure mentioned above, other features and advantages of the present disclosure will be described below and would be clearly understood from the description by those skilled in the art.

According to an embodiment of the present disclosure, an electrolytic copper foil, which has a width direction weight deviation of 5% or less, a tensile strength of 25 kgf/mm$^2$ to 62 kgf/mm², and a valley depth-to-thickness (VDT) of 3.5 to 66.9, includes a copper layer, wherein the width direction weight deviation is calculated according to Equation 1 below, and the VDT is calculated according to Equation 2 below:

width direction weight deviation (%) = [Equation 1]

(standard deviation of weight/arithmetic mean of weight) × 100, and

VDT = [thickness of electrolytic copper foil]/ [Equation 2]

[maximum valley depth of roughness profile ($Rv$)].

The electrolytic copper foil may have a deviation of valley depth-to-thickness in a width direction (DVDT) of 2.6 µm² or less, and the DVDT may be calculated according to Equation 4 below:

$$DVDT = \frac{VDT_{max} - VDT_{min}}{VDT_{Average}}.$$ [Equation 4]

The electrolytic copper foil may have an average width of roughness profile elements (RSm) of 25 µm to 171 µm.

In the electrolytic copper foil, a variation ratio [FWHM (200)] of a full width at half maximum (FWMH) of a (200) face may be in a range of 0.81 to 1.19 and may be calculated according to Equation 5 below:

[$FWHM$(200)] = [Equation 5]

[$FWMH$ of (200) face after heat treatment]/

[$FWMH$ of (200) face before heat treatment].

The electrolytic copper foil may have a thickness of 4 µm to 20 µm.

The electrolytic copper foil may further include a protective layer disposed on the copper layer.

The protective layer may include at least one selected from among chromium (Cr), a silane compound, and a nitrogen compound.

According to another embodiment of the present disclosure, an electrode for a secondary battery includes the electrolytic copper foil, and an active material layer disposed on the electrolytic copper foil.

According to still another embodiment of the present disclosure, a secondary battery includes a cathode, an anode, an electrolyte which provides an environment in which lithium ions are movable between the cathode and the anode, and a separator configured to electrically insulate the cathode and the anode.

According to yet another embodiment of the present disclosure, a method of manufacturing an electrolytic copper foil includes preparing an electrolyte and performing electroplating using the electrolyte to form a copper layer, wherein the electrolyte includes copper ions at a concentration of 50 g/L to 100 g/L, a sulfuric acid at a concentration of 50 g/L to 150 g/L, chlorine (Cl) at a concentration of 1 ppm to 50 ppm, lead ions ($Pb^{2+}$) at a concentration of 0.25 g/L, and an organic additive in a small amount, and the formation of the copper layer includes applying a current at a current density of 40 A/dm² to 80 A/dm² between an electrode plate and a rotating drum disposed to be spaced apart from each other in the electrolyte.

In the formation of the copper layer, the electrolyte may be circulated at a flow rate of 34 m³/hr to 50 m³/hr.

In the formation of the copper layer, the electrolyte may be supplied with a deviation in flow rate of 10% or less per unit minute, and the deviation in flow rate per unit minute may be calculated according to Equation 6 below:

deviation in flow rate per minute of electrolyte (%)= [(maximum value of flow rate per minute−minimum value of flow rate per minute)/average value of flow rate per minute]×100. [Equation 6]

The organic additive may include a moderator including a nonionic water-soluble polymer.

The moderator may include at least one nonionic water-soluble polymer selected from among a polyethylene glycol (PEG)-polypropylene glycol (PPG) copolymer, PEG, polypropylene glycol, a polyethylene polypropylene copolymer, polyglycerin, polyethylene glycol dimethyl ether, hydroxyethylene cellulose, polyvinyl alcohol, stearic acid polyglycol ether, and stearyl alcohol polyglycol ether.

The moderator may include a PEG-PPG copolymer.

The PEG-PPG copolymer may be contained at a concentration of 5 mg/L to 50 mg/L.

The PEG-PPG copolymer may have a number average molecular weight of 1,000 to 5,000.

The electrolyte may include glycine at a concentration of 5 mg/L to 75 mg/L.

The method may further include forming a protective layer on the copper layer.

The forming of the protective layer may include performing anti-corrosion treatment on a surface of the copper layer using at least one selected from among chromium (Cr), a silane compound, and a nitrogen compound.

The general description of the present disclosure as described above is merely intended to illustrate or explain the present disclosure and does not limit the scope of the present disclosure.

According to one embodiment of the present disclosure, wrinkles or tears are prevented in a manufacturing process of an electrolytic copper foil. It is possible to manufacture a secondary battery having a long lifetime capable of maintaining high charge/discharge capacity for a long time even when a charge/discharge cycle is repeated. In addition, when such an electrolytic copper foil is used, wrinkles or tears of the electrolytic copper foil are prevented in a manufacturing process of an electrode for a secondary battery or a secondary battery.

BRIEF DESCRIPTION OF THE DRAWINGS

The accompanying drawings, which are included to provide a further understanding of the present disclosure and are incorporated in and constitute a part of this application, illustrate embodiments of the present disclosure and serve to explain the principle of the disclosure together with the description;

FIG. 1 is a schematic cross-sectional view of an electrolytic copper foil according to one embodiment of the present disclosure;

FIG. 2 shows an example of a roughness profile for describing a "maximum valley depth of roughness profile (Rv)" according to JIS B 0601:2001 standards;

FIG. 3 shows an example of a roughness profile for describing a "mean width of roughness profile elements (RSm)" according to JIS B 0601:2001 standards;

FIG. 4 shows an example of an X-ray diffraction (XRD) graph of an electrolytic copper foil;

FIG. 5 is a schematic cross-sectional view of an electrolytic copper foil according to another embodiment of the present disclosure;

FIG. 6 is a schematic cross-sectional view of an electrode for a secondary battery according to still another embodiment of the present disclosure;

FIG. 7 is a schematic cross-sectional view of an electrode for a secondary battery according to yet another embodiment of the present disclosure;

FIG. 8 is a schematic cross-sectional view of a secondary battery according to yet another embodiment of the present disclosure; and FIG. 9 is a schematic view of a method of manufacturing the copper foil shown in FIG. 5.

DETAILED DESCRIPTION

Hereinafter, embodiments of the present disclosure will be described in detail with reference to the accompanying drawings.

It will be apparent to those skilled in the art that various modifications and variations can be made in the present disclosure without departing from the spirit and scope of the present disclosure. Thus, it is intended that the present disclosure covers the modifications and variations of this disclosure provided they come within the scope of the appended claims and their equivalents.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification.

The terms such as "including," "having," and "consist of" used herein are generally intended to allow other components to be added unless the terms are used with the term "only." Any references to the singular may include the plural unless expressly stated otherwise. Components are interpreted to include an ordinary error range even if not expressly stated.

When the position relation between two portions is described using the terms such as "on," "above," "below," and "next," one or more portions may be positioned between the two positions unless the term "immediately" or "directly" is used.

When the description of the time sequential relation includes "after," "followed by," "next," "before," etc., non-continuous cases may be included unless "right" or "direct" is used.

Terms such as first, second, etc. may be used to describe various components, but these components are not limited by these terms. These terms are only used to distinguish one element from other components. Thus, the first component referred to below may be a second component within the scope of the present disclosure.

The term "at least one" should be understood to include any combination possible from one or more related items.

Features of various embodiments of the present disclosure may be partially or overall coupled to or combined with each other and may be variously inter-operated with each other and driven technically. The embodiments of the present disclosure may be carried out independently from each other or may be carried out together in a co-dependent relationship.

FIG. 1 is a schematic cross-sectional view of an electrolytic copper foil 101 according to one embodiment of the present disclosure.

As shown in FIG. 1, the electrolytic copper foil 101 of the present disclosure includes a copper layer 111. The copper layer 111 has a matte surface MS and a shiny surface SS opposite to the matte surface MS.

For example, the copper layer 111 may be formed on a rotating anode drum through electroplating (see FIG. 9). In this case, the shiny surface SS refers to a surface in contact with the rotating anode drum in an electroplating process, and the matte surface MS refers to a surface opposite to the shiny surface SS.

With respect to the copper layer 111, the electrolytic copper foil 101 has a first surface S1 that is a surface in the direction of the matte surface MS and a second surface S2 that is a surface in the direction of the shiny surface SS. Referring to FIG. 1, the first surface S1 of the electrolytic copper foil 101 is a surface of a first protective layer 112a, and the second surface S2 is the shiny surface SS. According to one embodiment of the present disclosure, the first protective layer 112a may be omitted, and when the first protective layer 112a is omitted, the matte surface MS of the copper layer 111 becomes the first surface S1.

In general, the second surface has surface roughness (Rz) lower than that of the first surface. However, one embodiment of the present disclosure is not limited thereto, and the surface roughness (Rz) of the second surface may be higher than or equal to the surface roughness (Rz) of the first surface. For example, according to a polishing degree of the rotating anode drum 12 (see FIG. 9) used for manufacturing the copper layer 111, the surface roughness of the second surface may be lower or higher than the surface roughness (Rz) of the first surface. A surface of the rotating anode drum 12 may be polished using a polishing brush having a grit of #800 to #3000.

Referring to FIG. 1, the electrolytic copper foil 101 includes the first protective layer 112a disposed on the matte surface MS of the copper layer 111. The first protective layer 112a may be omitted.

A first protective layer 112a may be disposed on at least one of the matte surface MS and the shiny surface SS of the copper layer 111. Referring to FIG. 1, the first protective layer 112a is disposed on the matte surface MS. However, one embodiment of the present disclosure is not limited thereto, and the first protective layer 112a may be disposed only on the shiny surface SS or may be disposed on both the matte surface MS and the shiny surface SS.

The first protective layer 112a may protect the copper layer 111 to prevent the copper layer 111 from being oxidized or degraded during storage or distribution. Therefore, the first protective layer 112a is also referred to as an anticorrosive film. According to one embodiment of the present disclosure, the protective layer 112 may include at least one selected from among chromium (Cr), a silane compound, and a nitrogen compound.

For example, the first protective layer 112a may be made of an anticorrosive liquid including chromium (Cr), that is, an anticorrosive liquid including a chromic acid compound.

The electrolytic copper foil 101 of the present disclosure may have a tensile strength of 25 kgf/mm$^2$ to 62 kgf/mm$^2$ at room temperature (25±15° C.).

The tensile strength is measured using a universal testing machine (UTM), and in this case, after a sample is heat-treated at a temperature of 135° C. for 10 minutes, the tensile strength is measured. In this case, a width of the sample is 12.7 mm, a distance between grips is 50 mm, and a test speed is 50 mm/min.

When the tensile strength of the electrolytic copper foil 101 is less than 25 kgf/mm$^2$, the electrolytic copper foil 101 is easily deformed due to a force applied in a roll-to-roll process of a manufacturing process of an electrode and/or a manufacturing process of a secondary battery, and thus, there is a risk that tears and/or wrinkles occur. On the other hand, when the tensile strength of the electrolytic copper foil 101 exceeds 62 kgf/mm$^2$, and when the electrolytic copper foil 101 receives tension in a manufacturing process, there is a high risk that the electrolytic copper foil 101 is torn, and there is a decrease in workability of a manufacturing process of a secondary battery.

A width direction weight deviation of the electrolytic copper foil 101 of the present disclosure may be 5% or less. The width direction weight deviation may be obtained as follows.

First, samples having a size of 5 cm×5 cm are taken from left, center, and right points positioned in a width direction of the electrolytic copper foil 101 and then weights of the three samples are measured. Subsequently, an arithmetic mean and a standard deviation of the measured values are obtained, and a width direction weight deviation is calculated according to Equation 1 below.

$$\text{width direction weight deviation (\%)} = \qquad \text{[Equation 1]}$$
$$(\text{standard deviation of weight}/\text{arithmetic mean of weight}) \times 100$$

When the width direction weight deviation of the electrolytic copper foil 101 exceeds 5%, wrinkles occur at a portion at which the weight deviation exceeds 5% in a roll-to-roll process for battery manufacturing, and thus, a defect rate is increased.

Meanwhile, according to one embodiment of the present disclosure, as a secondary battery is repeatedly charged and discharged, active material layers 120*a* and 120*b* are alternately contracted and expanded to cause the separation of the active material layers 120*a* and 120*b* from the electrolytic copper foil 101, thereby reducing the capacity of the secondary battery. Accordingly, in order to allow an electrode to secure a capacity retention rate and lifetime at a predetermined level or more (i.e., in order to suppress a decrease in capacity of a secondary battery), the electrolytic copper foil 101 should have excellent coatability with respect to an active material so that adhesion strength between the electrolytic copper foil 101 and the active material layers 120*a* and 120*b* is allowed to be high.

In general, it is known that the adhesion strength between the electrolytic copper foil 101 and the active material layers 120*a* and 120*b* can be improved by controlling the surface roughness (Rz) of the electrolytic copper foil 101. The surface roughness (Rz) is also referred to as ten-point mean roughness. The surface roughness (Rz) is determined as a value obtained by adding the sum (absolute value) of distances to five points farthest upward from a center line of a sample section in a surface roughness profile and the sum (absolute value) of distances to five points farthest downward from the center line and dividing the added value by five. The surface roughness (Rz) may be measured according to JIS B 0601-2001 standards using a Mahrsurf M300 roughness tester manufactured by Mahr company.

When surface roughnesses (Rz1 and Rz2) of the first and second surfaces S1 and S2 of the electrolytic copper foil 101 are large, the first and second surfaces S1 and S2 of the electrolytic copper foil 101 are excessively non-uniform, and thus, the coating uniformity of an anode active material is lowered. Accordingly, adhesion between the electrolytic copper foil 101 and the active material layers 120*a* and 120*b* is significantly reduced.

However, actually, the electrolytic copper foil 101, in which the surface roughness (Rz) is appropriately adjusted (for example, adjusted to 2.5 μm or less), does not necessarily satisfy an adhesion force between the electrolytic copper foil 101 and the active material layers 120*a* and 120*b* required in a specification. That is, the electrolytic copper foil 101 having a surface roughness (Rz) of 2.5 μm or less may not always secure a capacity retention rate of 83% or more of a secondary battery (after charging and discharging 500 times) required in the industry.

In particular, it is known that, when the active material layers 120*a* and 120*b* include silicon (Si) to increase the capacity of the secondary battery, a relationship between the surface roughness (Rz) of the electrolytic copper foil 101 and the capacity retention rate of the secondary battery is lower.

According to one embodiment of the present disclosure, in securing an adhesion force between the electrolytic copper foil 101 and the active material layers 120*a* and 120*b* that is great enough to secure a capacity retention rate of 83% or more of a secondary battery, a "valley depth-to-thickness (VDT)" and a "deviation of valley depth-to-thickness in a width direction (DVDT)" have been found to be more important factors than the surface roughness (Rz).

Hereinafter, a "VDT" and a "DVDT" of the electrolytic copper foil 101 are described in detail with reference to FIG. 2.

A "thickness of electrolytic copper foil" and a "maximum valley depth of roughness profile (Rv)" may be measured and calculated, and a "VDT" may be obtained from the measured and calculated values of the "thickness of electrolytic copper foil" and the "maximum valley depth of roughness profile (Rv)" through a calculation according to Equation 2 below.

$$VDT = [\text{thickness of electrolytic copper foil}]/ \qquad \text{[Equation 2]}$$
$$[\text{maximum valley depth of roughness profile } (Rv)]$$

The "thickness of electrolytic copper foil" may be found by dividing weight per unit area of the electrolytic copper foil 101 by a density according to Equation 3 below. First, a sample having a size of 10 cm×10 cm is taken from an arbitrary point on the electrolytic copper foil 101, and then weight of the sample is measured. Subsequently, the weight per unit area of the electrolytic copper foil 101 may be obtained by dividing the measured weight of the sample by an area of (100 cm$^2$) of the sample. The density of the electrolytic copper foil 101 may be obtained by calculating weight per unit volume, and according to one embodiment of the present disclosure, an average density of the electrolytic copper foil 101 is about 8.92 g/cm$^3$.

thickness of electrolytic copper foil = [Equation 3]

[weight per unit area of electrolytic copper foil]/

[density of electrolytic copper foil]

For example, when the weight of the sample of the electrolytic copper foil 101 (width×length of the sample: 10 cm×10 cm) is measured and is 0.89 g, it can be seen that the thickness of copper foil is [(0.89 g/100 cm$^2$)]/[(8.92 g/cm$^3$)] which is about 0.0010 cm (i.e., about 10 μm).

As shown in FIG. 2, the "maximum valley depth of roughness profile (Rv)" defined in JIS B 0601:2001 standards refers to a depth of the deepest valley from a mean line in a surface roughness profile (sampling length: 4 mm).

"Maximum valley depths of roughness profile (Rv)" may be measured at three arbitrary points on a surface of the sample [sampling length: 4 mm, stylus tip radius: 2 μm, stylus tip taper angle: 60°, and measuring force: 0.75 mN] according to JIS B 0601-2001 standards using a roughness tester manufactured by Mitutoyo company, and then, an average value thereof may be calculated to obtain the above-described "maximum valley depth of roughness profile (Rv)." A roughness profile refers to a roughness profile of a surface of an electrolytic copper foil.

According to one embodiment of the present disclosure, a VDT1 and a VDT2 of the first and second surfaces S1 and S2 of the electrolytic copper foil 101 may be in a range of 3.5 to 66.9.

When the VDT1 and the VDT2 of the first and second surfaces S1 and S2 are less than 3.5, a valley of a surface of a copper foil may be too deep as compared with a thickness of the copper foil, and thus, stress may act on deep valleys to cause tears in a manufacturing process of the copper foil.

On the other hand, when the VDT1 and the VDT2 of the first and second surfaces S1 and S2 exceed 66.9, a valley of a surface of the electrolytic copper foil may be too shallow, and thus, in a roll-to-roll process for manufacturing the electrolytic copper foil 101, the electrolytic copper foil 101 may not be pressed against a roll, thereby resulting in wrinkles due to a slip.

The "DVDT" may be a deviation in the "VDT" and may be obtained through the following calculations.

First, for the "DVDT", samples having a size of 10 cm×10 cm are taken from left, center, and right points positioned in the width direction of the electrolytic copper foil 101, and then, a VDT of each of the three samples is measured. Next, an average value (VDT$_{average}$) of the VDTs measured in the three samples is calculated, and among the VDTs measured in the three samples, the lowest value is denoted as VDT$_{min}$, and the highest value is denoted as VDT$_{max}$. A "DVDT" may be obtained from VDT$_{average}$, VDT$_{min}$, and VDT$_{max}$ obtained as above through a calculation according to [Equation 4] below.

$$DVDT = \frac{VDT_{max} - VDT_{min}}{VDT_{Average}}. \quad \text{[Equation 4]}$$

According to one embodiment of the present disclosure, the DVDT1 and the DVDT2 of the first and second surfaces S1 and S2 of the electrolytic copper foil 101 may be 2.6 μm$^2$ or less.

When the DVDT1 and the DVDT2 of the first and second surfaces S1 and S2 exceed 2.6 μm$^2$, wrinkles may occur due to the DVDT in a roll-to-roll process for manufacturing the electrolytic copper foil 101.

Hereinafter, an "average width (RSm) of roughness profile elements" of the electrolytic copper foil 101 will be described in detail with reference to FIG. 3.

As shown in FIG. 3, the "average width (RSm) of roughness profile elements" defined in JIS B 0601:2001 standards is an average value of widths of profile elements having one pair of a peak and a valley adjacent to each other in a surface roughness profile (sampling length: 4 mm).

"Average widths (RSm) of roughness profile elements" of the present disclosure may be measured at three arbitrary points on a surface [sampling length: 4 mm, stylus tip radius: 2 μm, stylus tip taper angle: 60°, and measuring force: 0.75 mN] according to JIS B 0601-2001 standards using a roughness SJ-310 tester manufactured by Mitutoyo company, and then, an average value thereof may be calculated to obtain the "average width (RSm) of roughness profile elements" of the present disclosure.

According to the present disclosure, average widths (RSm1 and RSm2) of roughness profile elements of the first and second surfaces S1 and S2 are in a range of 25 μm to 171 μm.

When the average widths (RSm1 and RSm2) of roughness profile elements of the first and second surfaces S1 and S2 are less than 25 μm, non-uniform coating is caused due to too many uneven portions, and as a result, an adhesion force between the electrolytic copper foil 101 and the active material layers 120*a* and 120*b* is significantly lowered, thereby reducing a capacity retention rate of a secondary battery.

On the other hand, when the average widths (RSm1 and RSm2) of roughness profile elements of the first and second surfaces S1 and S2 exceed 171 μm, a sufficient adhesion force between the electrolytic copper foil 101 and the active material layers 120*a* and 120*b* may not be secured due to the lack of uneven portions capable of physically combining with an anode active material, thereby reducing a capacity retention rate of a secondary battery.

According to one embodiment of the present disclosure, the matte surface MS and the shiny surface SS of the copper layer 111 have crystal faces, and a full width at half maximum (FWMH) of a (200) face of each of the matte surface MS and the shiny surface SS in the copper layer 111 has a variation ratio [FWHM (200)] of 0.81 to 1.19. According to one embodiment of the present disclosure, the FWHM of the matte surface MS or the shiny surface SS of the copper layer 111 is also referred to as an FWHM of the electrolytic copper foil 101. In addition, according to one embodiment of the present disclosure, the variation ratio of the FWHM of the matte surface MS and the shiny surface SS of the copper layer 111 may also be referred to as a variation ratio [FWHM(hk1)] of an FWHM of the first and second surfaces S1 and S2 of the electrolytic copper foil 101.

Hereinafter, the variation ratio [FWHM(200)] of the FWHM of the (200) face of the electrolytic copper foil 101 will be described in detail with reference to FIG. 4.

An FWHM is a value of a graph width at a point corresponding to half of a peak value in a graph having a peak. According to one embodiment of the present disclosure, when X-ray diffraction (XRD) peaks of crystal faces of the copper layer 111 are observed, an FWHM refers to a value of a graph width at half of a peak value of each crystal face. In addition, in one embodiment of the present disclosure, the variation ratio [FWHM(hk1)] of the FWHM refers to a ratio of an FWHM value before heat treatment of the electrolytic copper foil 101 to an FWHM value after heat treatment thereof at a temperature of 105° C. for 30 minutes.

The FWHM and the variation ratio [FWHM(200)] of the FWHM of the (200) face may be obtained as follows.

FIG. 4 shows an example of an XRD graph of an electrolytic copper foil. More specifically, FIG. 4 is an XRD graph of the copper layer 111 constituting the electrolytic copper foil 101. The copper layer 111 of the electrolytic copper foil 101 may have a plurality of crystal faces, and the crystal face may be expressed using a Miller Index. Specifically, the crystal face of the copper layer 111 may be expressed as an (hk1) face. Peaks of FIG. 4 correspond to the crystal faces.

Each of the crystal faces may have an FWHM value, and the FWHM value may be measured using XRD of the copper layer 111. Before heat treatment, an FWHM of an (hk1) crystal face may be measured, and after heat treatment at a temperature of 105° C. for 30 minutes, an FWHM of the (hk1) crystal face may be measured. Thereafter, a variation ratio [FWHM(hk1)] of an FWHM may be calculated and obtained according to Equation 5 below.

$$[FWHM(hkl)] = [FWMH \text{ of } (hkl) \text{ face after heat treatment}] / [FWMH \text{ of } (hkl) \text{ face before heat treatment}] \quad \text{[Equation 5]}$$

The variation ratio [FWHM(200)] of the FWHM of the (200) face may be obtained as follows.

First, before heat treatment, an XRD method may be performed in a diffraction angle (2θ) ranging from 20° to 90° [target: copper K alpha 1, 2θ interval: 0.01°, and 2θ scan speed: 3°/min], thereby obtaining an XRD graph having peaks corresponding to n crystal faces (n=4) [for example, an XRD graph showing peaks corresponding to a (111) face, a (200) face, a (220) face, and a (311) face as shown in FIG. 4] and obtaining FWHMs of the crystal faces.

After the electrolytic copper foil 101 is heat-treated at a temperature of 105° C. for 30 minutes, an XRD method may be performed in the same manner as above to obtain an XRD graph having peaks corresponding to crystal faces and FWHMs of the crystal faces.

Among the FWHMs of the crystal faces, FWHMs of the (200) face before and after heat treatment may be calculated according to Equation 5 to obtain a variation ratio [FWHM(200)] of the FWHM of the (200) face.

When the variation ratio [FWHM(200)] of the FWHM of the (200) face is less than 0.81 or exceeds 1.19, a dimensional change of the electrolytic copper foil 101 occurs significantly due to a heat history received in a manufacturing process of a secondary battery, and due to such a dimensional change, there is a high risk of causing curls, tears, and wrinkles of the electrolytic copper foil 101 in a roll-to-roll process of the manufacturing process of the secondary battery, thereby resulting in defects.

According to one embodiment of the present disclosure, the electrolytic copper foil 101 may have a thickness of 4 µm to 20 µm.

When the electrolytic copper foil 101 is used as a current collector of an electrode in a secondary battery, as the electrolytic copper foil 101 becomes thinner, more current collectors can be accommodated in the same space, which is advantageous in increasing the capacity of the secondary battery. However, when the thickness of the electrolytic copper foil 101 is less than 4 µm, workability is significantly lowered in a manufacturing process of an electrode for a secondary battery and a secondary battery using the electrolytic copper foil 101. In addition, when the thickness of the electrolytic copper foil 101 is less than 4 µm, as the secondary battery is repeatedly charged and discharged, the electrolytic copper foil 101 is also alternately contracted and expanded, thereby increasing a risk of causing tears of the electrolytic copper foil 101.

On the other hand, when the thickness of the electrolytic copper foil 101 exceeds 20 µm, a thickness of an electrode for a secondary battery using the electrolytic copper foil 101 is increased, and due to the thickness, it may be difficult to implement high capacity of the secondary battery.

FIG. 5 is a schematic cross-sectional view of an electrolytic copper foil 102 according to another embodiment of the present disclosure. Hereinafter, to avoid repetition, descriptions of the above-described components will be omitted.

Referring to FIG. 5, the electrolytic copper foil 102 according to another embodiment of the present disclosure includes a copper layer 111 and first and second protective layers 112a and 112b respectively disposed on a matte surface MS and a shiny surface SS of the copper layer 111. When compared with the electrolytic copper foil 101 shown in FIG. 1, the electrolytic copper foil 102 shown in FIG. 5 further includes the second protective layer 112b disposed on the shiny surface SS of the copper layer 111.

For convenience of description, among the two protective layers, the protective layer disposed on the matte surface MS of the copper layer 111 is also referred to as a first protective layer 112a, and the protective layer disposed on the shiny surface SS is also referred to as a second protective layer 112b.

In addition, with respect to the copper layer 111, the electrolytic copper foil 102 shown in FIG. 5 has a first surface S1 that is a surface in the direction of the matte surface MS and a second surface S2 that is a surface in the direction of the shiny surface SS. Here, the first surface S1 of the electrolytic copper foil 102 is a surface of the first protective layer 112a disposed on the matte surface MS, and the second surface S2 is a surface of the second protective layer 112b disposed on the shiny surface SS.

According to another embodiment of the present disclosure, the two protective layers 112a and 112b may each include at least one selected from among chromium (Cr), a silane compound, and a nitrogen compound.

The electrolytic copper foil 102 shown in FIG. 5 may have a tensile strength of 25 kgf/mm² to 62 kgf/mm² at room temperature (25±15° C.).

A width direction weight deviation of the electrolytic copper foil 102 shown in FIG. 5 may be 5% or less.

A VDT1 and a VDT2 of the first and second surfaces S1 and S2 of the electrolytic copper foil 102 of FIG. 5 may be in a range of 3.5 to 66.9.

A DVDT1 and a DVDT2 of the first and second surfaces S1 and S2 of the electrolytic copper foil 102 of FIG. 2 may be 2.6 µm² or less.

Average widths (RSm1 and RSm2) of roughness profile elements of the first and second surfaces S1 and S2 of the electrolytic copper foil 102 of FIG. 5 may be in a range of 25 µm to 171 µm.

A variation ratio [FWHM(200)] of an FWHM of a (200) face in each of the matte surface MS or the shiny surface SS of the copper layer 111 of FIG. 5 may be in a range of 0.81 to 1.19.

The electrolytic copper foil 102 of FIG. 5 may have a thickness of 4 µm to 20 µm.

FIG. 6 is a schematic cross-sectional view of an electrode 103 for a secondary battery according to still another embodiment of the present disclosure. The electrode 103 for a secondary battery shown in FIG. 6 may be applied, for example, to a secondary battery 105 shown in FIG. 8.

Referring to FIG. 6, the electrode 103 for a secondary battery according to still another embodiment of the present disclosure includes an electrolytic copper foil 101 and an active material layer 120a disposed on the electrolytic copper foil 101. Here, the electrolytic copper foil 101 includes a copper layer 111 and a first protective layer 112a disposed on the copper layer 111 and is used as a current collector.

Specifically, the electrolytic copper foil 101 has a first surface S1 and a second surface S2, and the active material layer 120a is disposed on at least one of the first surface S1 and the second surface S2 of the electrolytic copper foil 101. The active material layer 120a may be disposed on the first protective layer 112a.

FIG. 6 illustrates an example in which the electrolytic copper foil 101 of FIG. 1 is used as a current collector. However, still another embodiment of the present disclosure is not limited thereto, and the electrolytic copper foil 102 shown in FIG. 5 may be used as a current collector of the electrode 103 for a secondary battery.

In addition, FIG. 6 illustrates a structure in which the active material layer 120a is disposed only on the first surface S1 of the electrolytic copper foil 101, but still another embodiment of the present disclosure is not limited thereto. First and second active material layers 120a and 120b may be disposed on both the first and second surfaces S1 and S2, respectively. In addition, an active material layer 120a may be disposed only on the second surface S2 of the electrolytic copper foil 101.

The active material layer 120a shown in FIG. 6 is made of an electrode active material, and in particular, may be made of an anode active material. That is, the electrode 103 for a secondary battery shown in FIG. 6 may be used as an anode.

The active material layer 120a may include at least one selected from among carbon, a metal, an alloy including a metal, a metal oxide, and a composite of a metal and carbon as an anode active material. As the metal, at least one selected from among silicon (Si), germanium (Ge), tin (Sn), lithium (Li), zinc (Zn), magnesium (Mg), cadmium (Cd), cerium (Ce), nickel (Ni), and iron (Fe) may be used. Specifically, in order to increase the charge/discharge capacity of a secondary battery, the metal may include silicon (Si).

As a secondary battery is repeatedly charged and discharged, the active material layer 120a is alternately contracted and expanded to cause the separation of the active material layer 120a from the electrolytic copper foil 101, thereby reducing the charge/discharge efficiency of the secondary battery. In particular, the active material layer 120a including silicon (Si) has a large degree of expansion and contraction.

According to still another embodiment of the present disclosure, since the electrolytic copper foil 101 used as a current collector may contract and expand in response to the contraction and expansion of the active material layer 120a, even when the active material layer 120a contracts and expands, the electrolytic copper foil 101 is not deformed or torn due to the contraction and expansion of the active material layer 120a. Accordingly, the electrolytic copper foil 101 and the active material layer 120a are not separated. As a result, a secondary battery including the electrode 103 for a secondary battery has excellent charge/discharge efficiency and an excellent capacity retention rate.

FIG. 7 is a schematic cross-sectional view of an electrode 104 for a secondary battery according to yet another embodiment of the present disclosure.

The electrode 104 for a secondary battery according to yet another embodiment of the present disclosure includes an electrolytic copper foil 102 and first and second active material layers 120a and 120b disposed on the electrolytic copper foil 102. The electrolytic copper foil 102 includes a copper layer 111 and first and second protective layers 112a and 112b disposed on both surfaces of the copper layer 111. However, one embodiment of the present disclosure is not limited thereto, and any one of the first active material layer 120a and the second active material layer 120b may be omitted.

Specifically, the electrode 104 for a secondary battery shown in FIG. 7 includes two first and second active material layers 120a and 120b disposed on first and second surfaces S1 and S2 of the electrolytic copper foil 102, respectively. Here, the active material layer 120a disposed on the first surface S1 of the electrolytic copper foil 102 is also referred to as a first active material layer, and the active material layer 120b disposed on the second surface S2 of the electrolytic copper foil 102 is also referred to as a second active material layer.

The two first and second active material layers 120a and 120b may be made of the same material through the same method or may be made of different materials or formed through different methods.

FIG. 8 is a schematic cross-sectional view of a secondary battery 105 according to yet another embodiment of the present disclosure. The secondary battery 105 shown in FIG. 8 is, for example, a lithium secondary battery.

Referring to FIG. 8, the secondary battery 105 includes a cathode 370, an anode 340, an electrolyte 350 disposed between the cathode 370 and the anode 340 to provide an environment in which ions are movable, and a separator 360 electrically insulating the cathode 370 and the anode 340. Here, the ions moving between the cathode 370 and the anode 340 are, for example, lithium ions. The separator 360 separates the cathode 370 and the anode 340 in order to prevent charges generated in one electrode from being consumed by moving to another electrode through the inside of the secondary battery 105. Referring to FIG. 8, the separator 360 is disposed in the electrolyte 350.

The cathode 370 may include a cathode current collector 371 and a cathode active material layer 372, and an aluminum foil may be used as the cathode current collector 371.

The anode 340 may include an anode current collector 341 and an anode active material layer 342, and an electrolytic copper foil may be used as the anode current collector 341.

According to one embodiment of the present disclosure, the electrolytic copper foil 101 or 102 illustrated in FIG. 1 or 5 may be used as the anode current collector 341. In addition, the electrodes 103 or 104 for a secondary battery shown in FIG. 6 or 7 may be used as the anode 340 of the secondary battery 105 shown in FIG. 8.

Hereinafter, a method of manufacturing an electrolytic copper foil 102 according to one embodiment of the present disclosure will be described in detail with reference to FIG. 9.

FIG. 9 is a schematic view of a method of manufacturing the electrolytic copper foil 102 shown in FIG. 5.

The method of manufacturing the electrolytic copper foil 102 of the present disclosure includes preparing an electrolyte 11 and performing electroplating using the electrolyte 11 to form a copper layer 111.

Specifically, in the preparing of the electrolyte 11, the electrolyte 11 including copper ions is prepared first. The electrolyte 11 is accommodated in an electrolytic cell 10.

Subsequently, in the performing of the electroplating using the electrolyte 11 to form the copper layer 111, a current at a current density of 40 to 80 ASD (A/dm$^2$) is applied to a cathode plate 13 and a rotating anode drum 12 disposed to be spaced apart from each other in the electrolyte 11 to perform the electroplating, thereby forming the copper layer 111 on the rotating anode drum 12. The copper layer 111 is formed by a principle of electroplating.

When the current density of the current applied between the cathode plate 13 and the rotating anode drum 12 is less than 40 ASD, the generation of crystal grains is facilitated in the copper layer 111, and when the current density exceeds 80 ASD, crystal grains rapidly become finer. More specifically, the current density may be adjusted to 50 ASD or more.

The surface characteristics of the shiny surface SS of the copper layer 111 may be changed according to the buffing or polishing degree of a surface of the rotating anode drum 12. In order to adjust the surface characteristics in the direction of the shiny surface SS, for example, the surface of the rotating anode drum 12 may be polished using a polishing brush having a grit of #800 to #3000.

In the formation of the copper layer 111, the electrolyte 11 is maintained at a temperature of 50° C. to 60° C. Furthermore, a flow rate at which the electrolyte 11 is supplied is in a range of 34 m$^3$/hr to 50 m$^3$/hr, and a deviation in flow rate is maintained at 10% or less per minute. In this case, by adjusting a composition of the electrolyte 11, the physical, chemical, and electrical properties of the copper layer 111 may be controlled.

According to one embodiment of the present disclosure, the electrolyte 11 includes copper ions at a concentration of 50 g/L to 100 g/L, a sulfuric acid at a concentration of 50 g/L to 150 g/L, chlorine (Cl) at a concentration of 1 ppm to 50 ppm, lead ions (Pb$^{2+}$) at a concentration of 0.25 g/L, and an organic additive in a small amount.

In order to facilitate the formation of the copper layer 111 through copper electrodeposition, the concentration of copper ions and the concentration of a sulfuric acid are adjusted in a range of 50 g/L to 100 g/L and a range of 50 g/L to 150 g/L in the electrolyte 11, respectively.

The concentration of the chlorine (Cl) in the electrolyte 11 is controlled in a range of 1 ppm to 50 ppm. However, one embodiment of the present disclosure is not limited thereto.

Chlorine (Cl) includes all of chlorine ions (Cl$^-$) and chlorine atoms present in a molecule. Chlorine (Cl) may, for example, be used to remove silver (Ag) ions introduced into the electrolyte 11 in a process of forming the copper layer 111. Specifically, chlorine (Cl) may precipitate silver (Ag) ions in the form of silver chloride (AgCl). The silver chloride (AgCl) may be removed through filtration.

When the concentration of the chlorine (Cl) is less than 1 ppm, silver (Ag) ions are not removed well. On the other hand, when the concentration of the chlorine (Cl) exceeds 50 ppm, unnecessary reaction may occur due to the excessive chlorine (Cl). Therefore, the concentration of the chlorine (Cl) in the electrolyte 11 is controlled in a range of 1 ppm to 50 ppm. More specifically, the concentration of the chlorine (Cl) may be controlled to be 25 ppm or less, for example, to be in a range of 5 ppm to 25 ppm.

The concentration of the lead ions (Pb$^{2+}$) in the electrolyte 11 is controlled to be 0.25 g/L or less. Other than lead ions (Pb$^{2+}$) present in the electrolyte 11, lead ions (Pb$^{2+}$) are adjusted so as to not be added to other added materials.

When the concentration of the lead ions (Pb$^{2+}$) in the electrolyte 11 exceeds 0.25 g/L, lead ions (Pb$^{2+}$) should be removed using an ion exchange filter.

When the concentration of the lead ions (Pb$^{2+}$) in the electrolyte 11 exceeds 0.25 g/L, in a process of forming the copper layer, copper is non-uniformly precipitated to cause a deviation in a VDT in a width direction, and thus, a DVDT exceeds 2.6 μm$^2$.

Meanwhile, according to one embodiment of the present disclosure, the organic additive included in a small amount in the electrolyte 11 may include a moderator including a nonionic water-soluble polymer.

The moderator reduces an electrodeposition speed of copper to prevent an abrupt increase in roughness and decrease in strength of the electrolytic copper foil 102. The moderator is also referred to as an inhibitor or a suppressor.

The moderator includes at least one nonionic water-soluble polymer selected from among a polyethylene glycol (PEG)-polypropylene glycol (PPG) copolymer, PEG, polypropylene glycol, a polyethylene polypropylene copolymer, polyglycerin, polyethylene glycol dimethyl ether, hydroxyethylene cellulose, polyvinyl alcohol, stearic acid polyglycol ether, and stearyl alcohol polyglycol ether. Specifically, the moderator may include the PEG-PPG copolymer.

In particular, the PEG-PPG copolymer among the nonionic water-soluble polymers used as the moderator allows the copper layer 111 to be uniformly electrodeposited during manufacturing of the electrolytic copper foil 102. Accordingly, a concentration of the PEG-PPG copolymer may be adjusted to adjust a VDT of the electrolytic copper foil 102. The PEG-PPG copolymer may be represented by Formula 1 below.

<Formula 1>

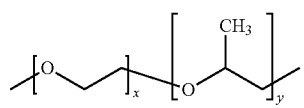

In Formula 1, each of x and y is independently an integer of one or more.

Among the moderators, the PEG-PPG copolymer may have a concentration of 5 mg/L to 50 mg/L in the electrolyte 11.

When the concentration of the PEG-PPG copolymer in the electrolyte 11 is less than 5 mg/L, the PEG-PPG copolymer is locally non-uniformly plated in an electroplating process of the electrolytic copper foil 102, and thus, a deep valley, in which a "maximum valley depth of roughness profile (Rv)" is great, is formed. As a result, the electrolytic copper foil 102 having a VDT of less than 3.5 is manufactured.

When the concentration of the PEG-PPG copolymer in the electrolyte 11 exceeds 50 mg/L, the copper layer 111 has a smooth surface having a mirror shape (mirror surface) in an electroplating process of the electrolytic copper foil 102, and thus, a "maximum valley depth of roughness profile (Rv)" is decreased. Therefore, a VDT of the electrolytic copper foil 102 exceeds 66.9.

Meanwhile, the PEG-PPG copolymer may have a number average molecular weight of 1,000 to 5,000.

When the number average molecular weight of the PEG-PPG copolymer is less than 1,000, the uniform electrodeposition effect of the copper layer 111 due to the PEG-PPG copolymer is insignificant, and when the number average molecular weight of the PEG-PPG copolymer exceeds 5,000, the copper layer 111 may not be easily formed due to the large molecular weight of the PEG-PPG copolymer.

According to one embodiment of the present disclosure, the electrolyte 11 may include glycine ($NH_2$—$CH_2$—COOH). The glycine may be adjusted to have a concentration of 5 mg/L to 75 mg/L in the electrolyte 11.

The glycine is a material added to the electrolyte 11 to control a size of copper plating particles in the electrolyte 11. When the size of the copper plating particles is too small, tensile strength of the electrolytic copper foil 102 is increased. On the contrary, when the size of the copper plating particles is too large, the tensile strength of the electrolytic copper foil 102 is decreased.

A concentration of the glycine in the electrolyte 11 is controlled in a range of 5 mg/L to 75 mg/L. However, one embodiment of the present disclosure is not limited thereto.

When the concentration of the glycine exceeds 75 mg/L, the copper plating particles are ultra-finely plated so that tensile strength of the electrolytic copper foil 102 after heat treatment exceeds 62 kgf/mm².

On the other hand, when the concentration of the glycine is less than 5 mg/L, the copper plating particles are coarsely plated so that tensile strength of the electrolytic copper foil 102 after heat treatment is less than 25 kgf/mm².

In the formation of the copper layer 111, a deviation in flow rate at which the electrolyte 11 is supplied is maintained at 10% or less per minute. The deviation in flow rate at which the electrolyte 11 is supplied is for adjusting a width direction weight deviation of the electrolytic copper foil 102. The deviation in flow rate may be obtained as follows.

First, a flow rate at which the electrolyte 11 is supplied is measured for one minute at least twice. By using the measured flow rate values per minute, an average value of a flow rate per minute, a maximum value of the flow rate per minute, and a minimum value of the flow rate per minute are obtained. Then, a deviation in flow rate at which the electrolyte is supplied may be calculated according to Equation 6 below.

$$\text{deviation in flow rate per minute of electrolyte (\%)} = \quad \text{[Equation 6]}$$
$$[(\text{maximum value of flow rate per minute} -$$
$$\text{minimum value of flow rate per minute}) / \text{average}$$
$$\text{value of flow rate per minute}] \times 100$$

In order to make the width direction weight deviation of the electrolytic copper foil 102 less than or equal to 5%, the deviation in flow rate at which the electrolyte 11 is supplied is maintained at 10% or less per minute. When the deviation in flow rate at which the electrolyte is supplied exceeds 10%, there occurs a deviation in flow rate at which the electrolyte 11 is supplied in a width direction of the electrolytic copper foil 102. Thus, there occurs a difference in efficiency when copper plating is performed in the width direction, and accordingly, a weight deviation of the electrolytic copper foil 102 exceeds 5%.

The copper layer 111 manufactured as above may be cleaned in a cleaning tank 20.

For example, an acid cleaning process for removing impurities on a surface of the copper layer 111, for example, resin components or natural oxides, and a water cleaning process for removing acidic solutions used for the acid cleaning may be sequentially performed. The cleaning process may be omitted.

According to one embodiment of the present disclosure, the method further includes forming first and second protective layers 112a and 112b on the copper layer 111.

In the forming of the protective layer, the first and second protective layers 112a and 112b are formed on the copper layer 111 manufactured as above.

Referring to FIG. 9, the copper layer 111 may be immersed in an anticorrosive liquid 31 contained in an anticorrosive liquid tank 30 to form the first and second protective layers 112a and 112b on the copper layer 111.

The anticorrosive liquid 31 may include at least one selected from among chromium (Cr), a silane compound, and a nitrogen compound.

Specifically, the anticorrosive liquid 31 in which the copper layer 111 is immersed may include chromium (Cr), and chromium (Cr) may be present in an ionic state in the anticorrosive liquid 31.

The anticorrosive liquid 31 may include chromium at a concentration of 0.5 g/L to 1.5 g/L. In order to form the first and second protective layers 112a and 112b, a temperature of the anticorrosive liquid 31 may be maintained in a range of 20° C. to 40° C. The copper layer 111 may be immersed in the anticorrosive liquid 31 for about 1 to 30 seconds.

Specifically, the manufactured copper layer 111 is immersed in an anticorrosive liquid including chromium (Cr) at a concentration of 0.5 g/L to 1.5 g/L (for example, at room temperature for 2 to 20 seconds) and then dried, thereby forming the first and second protective layers 112a and 112b on the copper layer 111.

The anticorrosive liquid may further include at least one selected from a silane compound and a nitrogen compound. For example, the anticorrosive liquid may include chromium (Cr) at a concentration of 0.5 g/L to 1.5 g/L and a silane compound at a concentration of 0.5 g/L to 1.5 g/L.

The protective layer is formed to manufacture the electrolytic copper foil 102.

Next, the electrolytic copper foil 102 is cleaned in the cleaning tank 40. Such a cleaning process may be omitted.

Next, after a drying process is performed, the electrolytic copper foil 102 is wound around a winder WR.

An anode active material may be applied on the electrolytic copper foil 102 manufactured as above according to the present disclosure, thereby manufacturing an electrode (that is, an anode) for a secondary battery of the present disclosure.

The anode active metal may be selected from the group consisting of carbon, a metal such as Si, Ge, Sn, Li, Zn, Mg, Cd, Ce, Ni, Fe, an alloy including the metal, an oxide of the metal, and a composite of the metal and the carbon.

For example, after 1 to 3 parts by weight of styrene butadiene rubber (SBR) and 1 to 3 parts by weight of carboxymethyl cellulose (CMC) are mixed into 100 parts by weight of carbon for an anode active material, distilled water is used as a solvent to prepare slurry. Subsequently, the slurry is applied to a thickness of 20 μm to 100 μm on the electrolytic copper foil 102 using a doctor blade and pressed at a temperature of 110° C. to 130° C. at a pressure of 0.5 ton/cm² to 1.5 ton/cm².

A lithium secondary battery may be manufactured using a conventional cathode, electrolyte, and separator together with the electrode (anode) for a secondary battery of the present disclosure manufactured through the above-described method.

Hereinafter, the present disclosure will be described in detail through Examples and Comparative Examples. However, the following Examples and Comparative Examples are provided to aid in the understanding of the present disclosure, but the scope of the present disclosure is not limited to the following Examples and Comparative Examples.

Examples 1 to 7 and Comparative Examples 1 to 6

By using a foil making machine including a cathode plate 13 and a rotating anode drum 12 disposed to be spaced apart from each other in an electrolyte 11, a copper layer 111 was manufactured by applying a current at a current density of 45 ASD to perform electroplating. The electrolyte 11 was a copper sulfate solution. In the electrolyte 11, a concentration of copper ions was 75 g/L, a concentration of a sulfuric acid was 100 g/L, and a concentration of chlorine (Cl) was in a range of 15 ppm to 25 ppm. A temperature of the electrolyte was set to 55° C., and a current density was set to 45 ASD. During electroplating, a plating solution was circulated between a supply tank and a plating tank at a flow rate of 37 m³/hr using a circulation pump, and fine impurities in the plating solution were removed in a cartridge filter between the supply tank and the plating tank.

In addition, a concentration of lead ions ($Pb^{2+}$), a concentration of a PEG-PPG copolymer (with an average molecular weight of 1,200 g/mol manufactured by Sigma-Aldrich company), and a concentration of glycine included in the electrolyte 11, and a deviation in flow rate at which the electrolyte is supplied during plating are shown in Table 1 below.

The copper layer 111 was manufactured by applying a current at a current density of 45 ASD between the rotating anode drum 12 and the cathode plate 13. Next, the copper layer 111 was immersed in an anticorrosive liquid for about 2 seconds to perform chromate treatment on a surface of the copper layer 111 to form the first and second protective layers 112a and 112b, thereby manufacturing an electrolytic copper foil 102. As the anticorrosive liquid, an anticorrosive liquid including a chromic acid as a main component was used, and a concentration of the chromic acid was 1.0 g/L. The copper layer formed through the electroplating was immersed in the anticorrosive liquid and dried, thereby completing the electrolytic copper foil.

As a result, electrolytic copper foils of Examples 1 to 7 and Comparative Examples 1 to 6 were manufactured.

TABLE 1

|  | $Pb^{2+}$ (g/L) | PEG-PPG copolymer (mg/L) | Glycine (mg/L) | Deviation in flow rate (%) |
|---|---|---|---|---|
| Example 1 | 0.25 | 25 | 40 | 5 |
| Example 2 | 0.11 | 5 | 40 | 5 |
| Example 3 | 0.11 | 50 | 40 | 5 |
| Example 4 | 0.11 | 25 | 5 | 5 |
| Example 5 | 0.11 | 25 | 75 | 5 |
| Example 6 | 0.11 | 25 | 40 | 2 |
| Example 7 | 0.11 | 25 | 40 | 10 |
| Comparative Example 1 | 0.26 | 25 | 40 | 5 |
| Comparative Example 2 | 0.11 | 4 | 40 | 5 |
| Comparative Example 3 | 0.11 | 51 | 40 | 5 |
| Comparative Example 4 | 0.11 | 25 | 4 | 5 |
| Comparative Example 5 | 0.11 | 25 | 76 | 5 |
| Comparative Example 6 | 0.11 | 25 | 40 | 11 |

(i) a VDT, (ii) a DVDT, (iii) tensile strength, (iv) a weight deviation, (v) an average width of roughness profile elements (RSm), and (vi) a variation ratio [FWHM(200)] of an FWMH of a (200) face were measured on the manufactured electrolytic copper foils of Examples 1 to 7 and Comparative Examples 1 to 6.

In addition, a secondary battery was manufactured using the copper foil, charging and discharging were performed on the secondary battery, and then, (vii) the secondary battery was disassembled to observe whether tears and wrinkles occurred in the electrolytic copper foil.

(i) VDT

A "thickness of electrolytic copper foil" and a "maximum valley depth of roughness profile (Rv)" were each measured, and a "VDT" may be obtained from the measured values of the "thickness of electrolytic copper foil" and the "maximum valley depth of roughness profile (Rv)" through a calculation according to Equation 2 below.

$$VDT = [\text{thickness of electrolytic copper foil}] / [\text{maximum valley depth of roughness profile } (Rv)] \quad [\text{Equation 2}]$$

The "thickness of electrolytic copper foil" may be found by dividing weight per unit area of an electrolytic copper foil 101 by a density according to Equation 3 below. First, a sample having a size of 10 cm×10 cm is taken from an arbitrary point on the electrolytic copper foil 101, and then weight of the sample is measured. Subsequently, the weight per unit area of the electrolytic copper foil 101 may be obtained by dividing the measured weight of the sample by an area of (100 cm²) of the sample. The density of the electrolytic copper foil 101 may be obtained by calculating weight per unit volume, and according to one embodiment of the present disclosure, an average density of the electrolytic copper foil 101 is about 8.92 g/cm³.

$$\text{thickness of electrolytic copper foil} = [\text{weight per unit area of electrolytic copper foil}] / [\text{density of electrolytic copper foil}] \quad [\text{Equation 3}]$$

"Maximum valley depths of roughness profile (Rv)" may be measured at three arbitrary points on a surface of the sample [sampling length: 4 mm, stylus tip radius: 2 µm, stylus tip taper angle: 60°, and measuring force: 0.75 mN] according to JIS B 0601-2001 standards using a roughness tester manufactured by Mitutoyo company, and then, an average value thereof may be calculated to obtain the above-described "maximum valley depth of roughness profile (Rv)." A roughness profile refers to a roughness profile of a surface of an electrolytic copper foil.

(ii) DVDT

For the "DVDT", samples having a size of 10 cm×10 cm are taken from left, center, and right points positioned in a width direction of the electrolytic copper foil 101, and then, a VDT of each of the three samples is measured. Next, an average value ($VDT_{average}$) of the VDTs measured in the three samples is calculated, and among the VDTs measured in the three samples, the lowest value is denoted as $VDT_{min}$, and the highest value is denoted as $VDT_{max}$. A "DVDT" may be obtained from $VDT_{average}$, $VDT_{min}$, and $VDT_{max}$ obtained as stated above through a calculation according to Equation 4 below.

$$DVDT = \frac{VDT_{max} - VDT_{min}}{VDT_{Average}} \quad \text{[Equation 4]}$$

(iii) Tensile Strength

Tensile strength is measured using a UTM, and in this case, after a sample is heat-treated at a temperature of 135° C. for 10 minutes, the tensile strength is measured. In this case, a width of the sample is 12.7 mm, a distance between grips is 50 mm, and a test speed is 50 mm/min.

(iv) Weight Deviation

Samples having a size of 5 cm×5 cm are taken from left, center, and right points positioned in the width direction of the electrolytic copper foil 101, and then, weight of each of the three samples is measured. Subsequently, an arithmetic mean and a standard deviation of the measured values are obtained, and a width direction weight deviation is calculated according to Equation 1 below.

width direction weight deviation (%) = [Equation 1]

(standard deviation of weight / arithmetic mean of weight) × 100

(v) Average Width of Roughness Profile Elements (RSm)

"Average widths of roughness profile elements (RSm)" may be measured at three arbitrary points on a surface [sampling length: 4 mm, stylus tip radius: 2 µm, stylus tip taper angle: 60°, and measuring force: 0.75 mN] according to JIS B 0601-2001 standards using a roughness tester SJ-310 manufactured by Mitutoyo company, and then, an average value thereof may be calculated to obtain an "average width of roughness profile elements (RSm)."

(vi) Variation Ratio [FWHM(200)] of FWHM of (200) Face

Before heat treatment and after heat treatment at a temperature of 105° C. for 30 minutes, an XRD method is performed within a diffraction angle 2θ of 20° to 90° [target: copper K alpha 1, 2θ interval: 0.01°, and 2θ scan speed: 3°/min], thereby obtaining an XRD graph having peaks corresponding to n crystal faces (n=4) [for example, an XRD graph showing peaks corresponding to a (111) face, a (200) face, a (220) face, and a (311) face as shown in FIG. 4], FWHMs of the crystal faces, and variation ratios [FWHM (hk1)] of the FWHMs of the crystal faces.

The variation ratio [FWHM(200)] of the FWHM of the (200) face may be obtained from the FWHMs of the (200) face before and after the heat treatment among the FWHMs of each crystal face through a calculation according to Equation 5 below.

[FWHM(hkl)] = [FWMH of (200) face after heat treatment] / [FWMH of (200) face before heat treatment]     [Equation 5]

(vii) Observation of Occurrences of Wrinkles and Tears

1) Manufacturing of Anode

After 2 parts by weight of SBR and 2 parts by weight of CMC were mixed into 100 parts by weight of a commercially available silicon/carbon composite anode material for an anode active material, slurry for an anode active material was prepared using distilled water as a solvent. The slurry was applied to a thickness of 40 µm on the electrolytic copper foils having a width of 10 cm of Examples 1 to 7 and Comparative Examples 1 to 6 using a doctor blade and dried at a temperature of 120° C., and a pressure of 1 ton/cm² was applied thereon, thereby manufacturing an anode for a secondary battery.

2) Preparation of Electrolyte $LiPF_6$ as a solute was dissolved at a concentration of 1M in a non-aqueous organic solvent in which ethylene carbonate (EC) and ethyl methyl carbonate (EMC) are mixed in a ratio of 1:2, thereby preparing a basic electrolyte. A non-aqueous electrolyte was prepared by mixing 99.5% by weight of the basic electrolyte and 0.5% by weight of succinic anhydride.

3) Manufacturing of Cathode

Lithium manganese oxide ($Li_{1.1}Mn_{1.85}Al_{0.05}O_4$) and lithium manganese oxide (o-$LiMnO_2$) having an orthorhombic crystal structure were mixed in a ratio (weight ratio) of 90:10 to prepare a cathode active material. The cathode active material, carbon black, and poly(vinylidenefluoride) (PVDF) as a binder were mixed in a ratio (weight ratio) of 85:10:5 and mixed with NMP as an organic solvent to prepare slurry. The prepared slurry was applied on both surfaces of an Al foil having a thickness of 20 µm and dried to prepare a cathode.

4) Manufacturing of Test Lithium Secondary Battery

In an aluminum can, a cathode and an anode were disposed to be insulated from the aluminum can, and a non-aqueous electrolyte and a separator were disposed therebetween, thereby manufacturing a lithium secondary battery in the form of a coin. The used separator was polypropylene (Celgard 2325 with a thickness of 25 µm, an average pore size of φ28 nm, and a porosity of 40%).

5) Charging/Discharging of Secondary Battery

The lithium secondary battery manufactured as above was driven with a charging voltage of 4.3 V and a discharging voltage of 3.4 V, and charging and discharging were performed 100 times at a high temperature of 50° C. at a current rate (C-rate) of 0.2 C.

6) Occurrence of Wrinkles or Tears

After the charging and discharging were performed 100 times, the secondary battery was disassembled to observe whether wrinkles or tears occurred in the copper foil. A case in which wrinkles or tears occurred was designated as "occurrence", and a case in which wrinkles or tears did not occur was designated as "no."

Test results are shown in Table 2.

TABLE 2

| classification | VDT | DVDT (μm²) | Tensile strength (kgf/mm²) | Weight deviation (%) | RSm (μm) | [FWHM(200)] | Tear | Wrinkle |
|---|---|---|---|---|---|---|---|---|
| Example 1 | 35.2 | 2.6 | 42 | 2 | 87 | 1.02 | no | no |
| Example 2 | 3.5 | 0.9 | 42 | 2 | 25 | 1.04 | no | no |
| Example 3 | 66.9 | 0.9 | 43 | 3 | 171 | 0.99 | no | no |
| Example 4 | 36.0 | 0.8 | 25 | 2 | 85 | 0.81 | no | no |
| Example 5 | 36.4 | 0.8 | 62 | 2 | 87 | 1.19 | no | no |
| Example 6 | 35.8 | 0.8 | 42 | 1 | 87 | 0.98 | no | no |
| Example 7 | 35.5 | 0.9 | 43 | 5 | 86 | 1.02 | no | no |
| Comparative Example 1 | 35.8 | 2.8 | 43 | 3 | 85 | 1.04 | no | occurrence |
| Comparative Example 2 | 3.4 | 0.9 | 43 | 3 | 23 | 0.98 | occurrence | no |
| Comparative Example 3 | 71.2 | 0.8 | 42 | 2 | 173 | 1.02 | no | occurrence |
| Comparative Example 4 | 36.1 | 0.8 | 24 | 2 | 88 | 0.79 | occurrence | occurrence |
| Comparative Example 5 | 36.0 | 0.8 | 64 | 2 | 88 | 1.22 | occurrence | no |
| Comparative Example 6 | 36.2 | 0.9 | 42 | 6 | 85 | 1.05 | no | occurrence |

The following results can be confirmed with reference to Tables 1 and 2.

The electrolytic copper foil of Comparative Example 1 manufactured using an electrolyte including lead ions ($Pb^{2+}$) in an excessive amount had a DVDT of 2.8 μm² which was greater than a reference value, and wrinkles occurred in the electrolytic copper foil.

The electrolytic copper foil of Comparative Example 2 manufactured using an electrolyte including a PEG-PPG copolymer in a small amount had a VDT of 3.4 which was smaller than the reference value and had an average width of roughness profile elements (Rsm) of 23 μm which was smaller than a reference value, and tears occurred in the electrolytic copper foil. The electrolytic copper foil of Comparative Example 3 manufactured using an electrolyte including a PEG-PPG copolymer in an excessive amount had a VDT of 71.2 which was greater than the reference value and had an average width of roughness profile elements (Rsm) of 173 μm which was greater than the reference value, and wrinkles occurred in the electrolytic copper foil.

The electrolytic copper foil of Comparative Example 4 manufactured using an electrolyte including glycine in a small amount had a tensile strength of 24 kgf/mm² which was smaller than a reference value and had an [FWHM (200)] of 0.7 which was smaller than a reference value, and tears and wrinkles occurred in the electrolytic copper foil. In addition, the electrolytic copper foil of Comparative Example 5 manufactured using an electrolyte including glycine in an excessive amount had a tensile strength of 64 kgf/mm² which was greater than the reference value and had an [FWHM (200)] of 1.22 which was greater than the reference value, and tears occurred in the electrolytic copper foil.

The electrolytic copper foil of Comparative Example 6, which was manufactured by supplying the electrolyte 11 in a high deviation in flow rate which was 11% per minute, had a weight deviation of 6% which was higher than a reference value, and instead of tears, wrinkles occurred.

On the other hand, in the copper foils of Examples 1 to 7 according to the present disclosure, all values were within the reference value, and wrinkles and tears did not occur.

It will be apparent to those skilled in the art that the present disclosure described above is not limited by the above-described embodiments and the accompanying drawings and that various substitutions, modifications, and variations can be made in the present disclosure without departing from the spirit and scope of the present disclosure. Consequently, the scope of the present disclosure is defined by the accompanying claims, and it is intended that all variations and modifications derived from the meaning, scope, and equivalent concept of the claims fall within the scope of the present disclosure.

DESCRIPTIONS OF REFERENCE NUMERALS

101, 102: copper foil
112a, 112b: first and second protective layers
120a, 120b: first and second active material layers
103, 104: electrode for secondary battery
MS: matte surface
SS: shiny surface

The invention claimed is:

1. An electrolytic copper foil that has a width direction weight deviation of 5% or less, a tensile strength of 25 kgf/mm² to 62 kgf/mm², a valley depth-to-thickness (VDT) of 3.5 to 66.9, the electrolytic copper foil comprising a copper layer, and a deviation of valley depth-to-thickness in a width direction (DVDT) of 2.6 μm² or less,
wherein the width direction weight deviation is calculated according to Equation 1 below, the VDT is calculated according to Equation 2 below, and the DVDT is calculated according to Equation 3 below:

width direction weight deviation (%) = [Equation 1]

(standard deviation of weight/arithmetic mean of weight) × 100, $VDT$ = [thickness of electrolytic copper foil]/ [maximum valley depth of roughness profile($Rv$)], and [Equation 2]

$$DVDT = \frac{VDT_{max} - VDT_{min}}{VDT_{Average}}$$ [Equation 3]

wherein the VDT is measured at least three points of the electrolytic copper foil, and an average value of values of the measured VDT is denoted as $VDT_{average}$, a highest value thereof is denoted as $VDT_{max}$, and a lowest value thereof is denoted as $VDT_{min}$.

2. The electrolytic copper foil of claim 1, wherein the electrolytic copper foil has an average width of roughness profile elements (RSm) of 25 μm to 171 μm.

3. The electrolytic copper foil of claim 1, wherein a variation ratio [FWHM(200)] of a full width at half maximum (FWMH) of a (200) face is in a range of 0.81 to 1.19 and is calculated according to Equation 5 below:

$$[FEHM(200)] = [FWMH \text{ of } (200) \text{ face after heat treatment}] / [FWMH \text{ of } (200) \text{ face before heat treatment}]. \quad \text{[Equation 5]}$$

4. The electrolytic copper foil of claim 1, wherein the electrolytic copper foil has a thickness of 4 μm to 20 μm.

5. The electrolytic copper foil of claim 1, further comprising a protective layer disposed on the copper layer.

6. The electrolytic copper foil of claim 5, wherein the protective layer includes at least one selected from among chromium (Cr), a silane compound, and a nitrogen compound.

7. An electrode for a secondary battery, comprising:
the electrolytic copper foil of claim 1; and
an active material layer disposed on the electrolytic copper foil.

8. A secondary battery comprising:
a cathode;
an anode;
an electrolyte which provides an environment in which lithium ions are movable between the cathode and the anode; and
a separator configured to electrically insulate the cathode and the anode,
wherein the anode is formed of the electrode for a secondary battery of claim 7.

* * * * *